United States Patent Office 2,888,402
Patented May 26, 1959

2,888,402
PROCESS FOR PREPARING LUBRICATING GREASES

Nels A. Nelson, Pittsburgh, Pa., assignor to Esso Research and Engineering Company, a corporation of Delaware No Drawing. Application April 7, 1954
Serial No. 421,693

3 Claims. (Cl. 252—36)

This invention relates to a process for the preparation of lubricating grease compositions, particularly the invention relates to an improved process for the preparation of lubricating grease compositions which materially reduces the time required for dehydration of the composition. More particularly, the invention relates to a process for the preparation of lubricating grease compositions which utilizes the water of hydration or crystallization of the metallic hydroxide used to form the soap as a solvent medium for the metallic hydroxide, thus eliminating the necessity for the addition of water to the formulation.

In the past it has been found necessary to add the metal hydroxide to grease forming processes in the form of a water solution or slurry. This addition of water is undesirable in that it increases the heating time necessary for complete dehydration of the grease formulation. In the instant process the water of hydration of the metallic hydroxide is utilized to dissolve the metal hydroxide, thus eliminating the necessity for the addition of water to the process. This results in a great saving in heat, since the evaporation of the water used to prepare the metallic hydroxide solution in prior art methods is eliminated.

The preferred embodiment of this invention comprises the steps of mixing about 1 to about 20 parts by weight of a mineral lubricating oil with from about 0.5 to about 3 parts by weight of a hydrated metal hydroxide, heating the mixture to about 210° to 225° F. to liberate the water of hydration and to dissolve therein the metal hydroxide, adding to the heated mixture about 2 to 30 parts by weight of a soap-forming fatty acid, heating the mixture with stirring until the metal hydroxide is completely saponified, adding a solution of from 0.2 to 1.2 parts by weight of a non-hydrated metal hydroxide in about 1 to 6 parts of additional mineral oil, heating with stirring to a temperature within the range of from about 290° to 300° F. to completely saponify the acid and to drive off water of saponification, cooling the mixture to obtain a finished grease.

The process will be more clearly explained by reference to the following illustrative example:

In a steam-jacketed grease kettle, there was added about 7.2 lbs. of lithium hydroxide monohydrate and about 134 lbs. of a mineral lubricating oil having a viscosity at 210° F. of about 70 SUS. The mixture was heated and stirred to about 220° F. At this temperature the water of hydration was liberated and dissolved the lithium hydroxide, the solution forming an emulsion with the oil. There was added to the mixture about 56 pounds of cotton seed fatty acids without lowering the reaction temperature. A vigorous reaction took place and continued until all the lithium hydroxide was saponified.

As soon as the saponification of the lithium hydroxide was completed, as evidenced by the termination of the cooking action, about 3.2 pounds of calcium hydroxide was added to the mixture in the form of an oil slurry using about 50 pounds of the oil described above. Heating and stirring was continued until substantially all of the fatty acid added was saponified. After the saponification was completed, the mixture was heated to dehydration temperature, one within the range of about 290 to 300° F.

After dehydration, the heat was cut off and 150 pounds additional oil was added with stirring. The liquid grease composition was then cooled and homogenized and resulted in a transparent base of excellent appearance. Inspection data on this grease composition gave the following results:

ASTM penetration (77° F.) ___ 311.
ASTM dropping point _____ 320.
Alkalinity _____ 0.1% alkaline as sodium hydroxide.

It will be noted that an excellent grease composition was prepared as described above without the addition of water, utilizing only the water of hydration of the metal hydroxide.

The lubricating oil base stock which may be used to formulate grease compositions in accordance with the instant process may be selected from any of the naturally occuring mineral oils or synthetic oils known to the art. Mineral lubricating oils from either naphthenic or paraffinic base crudes may be used. It is preferred that the mineral lubricating oils have viscosities within the range of from about 20 to about 300 SUS at 210° F. with viscosities within the range of from about 35 to 120 SUS at 210° F. being especially preferred. Synthetic lubricating oils such as dibasic acid esters, complex esters or dibasic acids, glycols and alcohols, formals, complex formals, glycol ethers, glycol esters, polymerized olefins or mixtures of the above are also operable in the concept of this invention.

The metal hydroxide utilized in the inventive process must contain at least one molecule of water of hydration, although lithium hydroxide monohydrate is especially preferred and is contemplated in the preferred embodiment, barium hydroxide octohydrate, strontium hydroxide octohydrate and the like may also be used.

The soap-forming fatty acid used to prepare the grease compositions of this invention may be any of the commonly known grease forming acids. A partial list of the operable fatty acids would include:

Oleic acid
Stearic acid
Hydroxy stearic acid
Fish oil acids, either hydrogenated or unsaturated
Any of the vegetable fatty acids such as rape seed oil acids or cotton seed fatty acids, etc.
Glycerides
Tallow
Beef fat, or mixtures of the above.

It is preferred that the soap forming fatty acid used contain from between about 12 and 24 carbon atoms per molecule.

If desired, a second metal hydroxide may be used to form grease compositions in accordance with this invention. This second metal hydroxide is preferably a non-hydrated metal hydroxide or oxide and may be added to the formulation either dry or in the form of an oil slurry. Such materials as calcium hydroxide, magnesium hydroxide, zinc hydroxide, barium hydroxide, the corresponding oxides or mixtures may be used.

It is desirable that grease compositions prepared in accordance with the instant invention contain from between about 5% and 20% total soap content, percentages being by weight based on the weight of the total composition. The final soap content will determine the amount of the fatty acid used. It is preferable to add sufficient metal hydroxide to completely saponify the fatty acids used. If 2 or more metal hydroxides are used to prepare the soap, the ratios of the metals should be carefully adjusted. For instance, if the hydrated metal hydroxide is lithium and the non-hydrated metal hydroxide is calcium, as is contemplated in the preferred embodiment, the amounts should be adjusted to give a finished grease formulation wherein the mol ratio of the lithium soap to the calcium soap is within a range of from 3:1 to 6:1.

It is contemplated that additive materials may be blended with the lubricating greases of this invention. Normally, these additive materials are added to the formulation after heating ceases, but while the grease is still liquid. Such materials as color agents, tackiness agents, corrosion inhibitors, metal deactivators, syneresis preventives, extreme pressure agents and the like may be blended in the final formulation.

To summarize briefly, the instant invention relates to an improved process for the preparation of lubricating grease compositions. The process comprises utilizing the water of hydration of a hydrated metal hydroxide to dissolve the metal hydroxide and thus eliminating the necessity of adding water to the formulation. A substantial reduction in time and heat necessary for the dehydration is thus accomplished. In general, the process comprises the steps of heating a mixture of lubricating oil and a hydrated metal hydroxide with stirring until the water of hydration is liberated and dissolves the metal hydroxide, adding to the mixture a soap forming amount of a fatty acid, continuing the heating and stirring until the metal hydroxide is completely saponified and if desired, addition of a solution of a non-hydrated metal hydroxide in oil to the mixture to complete the saponification of the fatty acid, continuing the heating until the saponification is completed and the mixture is dehydrated and cooling the liquid grease composition to obtain the finished product.

What is claimed is:

1. A process for the preparation of lubricating grease compositions which consists of heating a mixture of a mineral oil and lithium hydroxide monohydrate with stirring to a temperature of about 220° F. to liberate the water of hydration and dissolve the lithium hydroxide therein, adding to said heated mixture an amount of a fatty acid sufficient to result in a finished grease composition containing from about 2% to about 30% soap, continuing said heating and stirring until said metal hydroxide is completely saponified, adding a solution of a non-hydrated metal hydroxide selected from the group consisting of calcium hydroxide, magnesium hydroxide, zinc hydroxide and barium hydroxide in additional mineral oil in amount sufficient to completely saponify the fatty acid, heating said mixture with stirring to a temperature of about 250° F. to dehydrate the mixture, and cooling the mixture to obtain a finished grease composition, and wherein is used about 0.5 to 3 parts by weight of said lithium hydroxide monohydrate per about 0.2 to 1.2 parts by weight of said non-hydrated metal hydroxide.

2. A process for the preparation of lubricating grease compositions which consists of heating a mixture of from 1 to 20 parts by weight of a mineral lubricating oil with from 0.5 to 3 parts by weight of lithium hydroxide monohydrate to a temperature within the range of from 210 to 225° F. to liberate the water of hydration and dissolve therein the lithium hydroxide, adding to said heated mixture from about 2 to 30 parts by weight of a soap-forming fatty acid, and heating with stirring until said lithium hydroxide is completely saponified, adding to said mixture a solution of from 0.2 to 1.2 parts by weight of calcium hydroxide in from 1 to 6 parts of additional mineral oil, heating the mixture with stirring to a temperature within the range of from 290 to 300° F. to completely saponify the fatty acid and to drive off water of saponification, homogenizing and cooling the mixture to obtain a finished grease composition.

3. A process for the preparation of lubricating grease compositions which consists of heating a mixture of from 1 to 20 parts by weight of a mineral lubricating oil with from 0.5 to 3 parts by weight of lithium hydroxide monohydrate to a temperature within the range of from 210 to 225° F. to liberate the water of hydration and dissolve therein the lithium hydroxide, adding to said heated mixture from about 5 to 30 parts by weight of a soap-forming fatty acid, and heating with stirring until said lithium hydroxide is completely saponified, adding to said mixture a solution of from 0.2 to 1.2 parts by weight of calcium hydroxide in from 1 to 6 parts by weight of additional mineral oil, continuing said heating and stirring to a temperature within the range of from 290 to 300° F. to completely saponify the fatty acid and to drive off water of saponification, adding additives if any, cooling and homogenizing the mixture to obtain a finished grease composition.

References Cited in the file of this patent

UNITED STATES PATENTS

| | | |
|---|---|---|
| 2,312,725 | Morway et al. | Mar. 2, 1943 |
| 2,382,694 | Darley | Aug. 14, 1945 |
| 2,389,523 | Leyda | Nov. 20, 1945 |
| 2,434,539 | Beerbower et al. | Jan. 13, 1948 |
| 2,444,720 | Bell | July 6, 1948 |
| 2,448,721 | Licata | Sept. 7, 1948 |
| 2,504,717 | Morway et al. | Apr. 18, 1950 |